Patented June 18, 1946

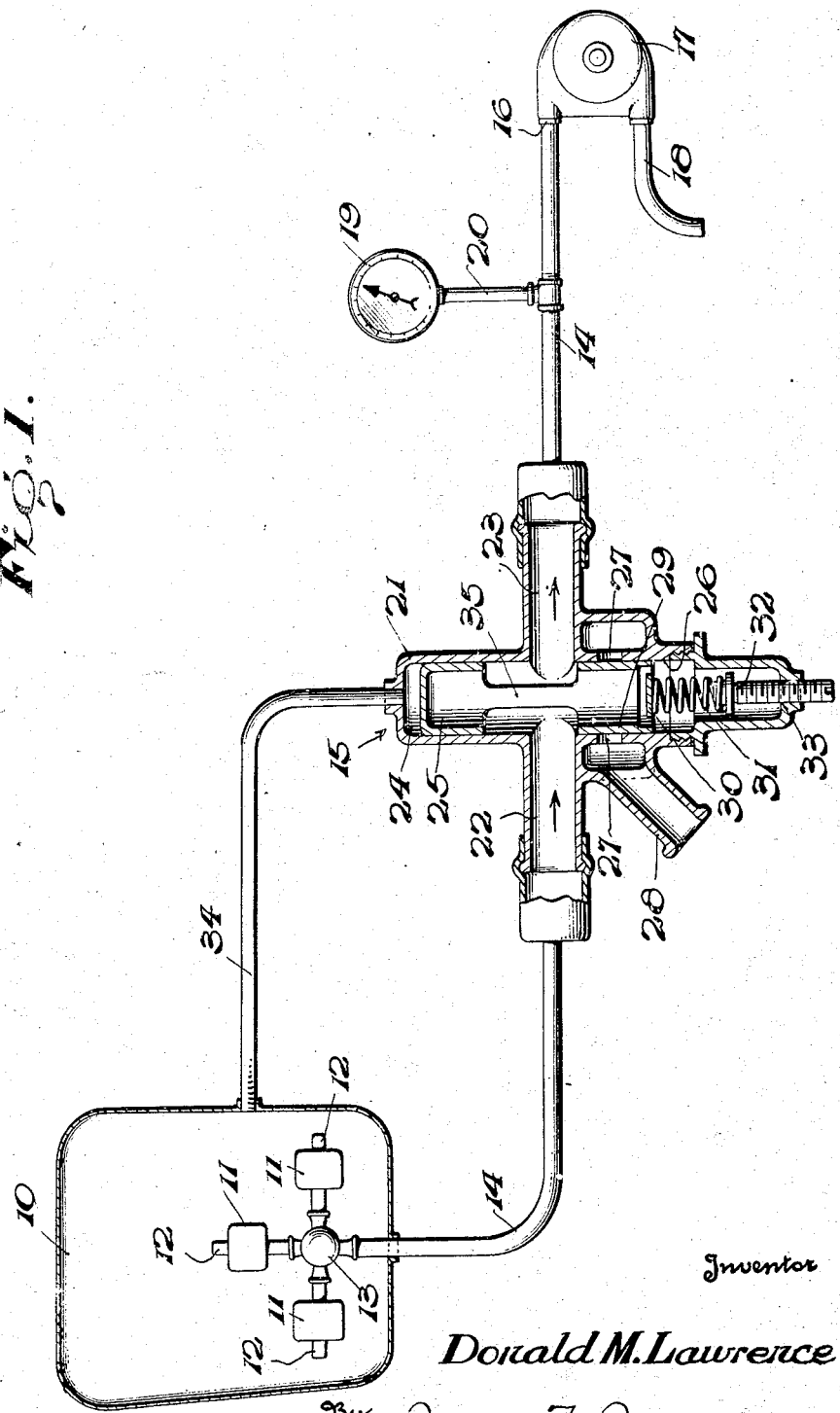

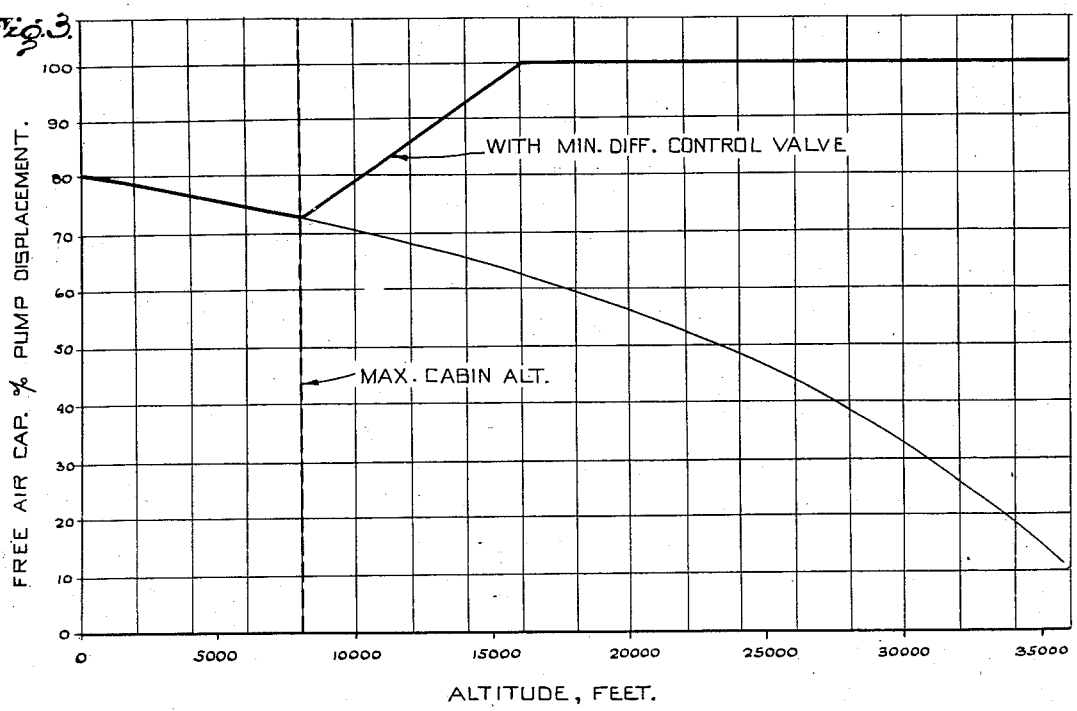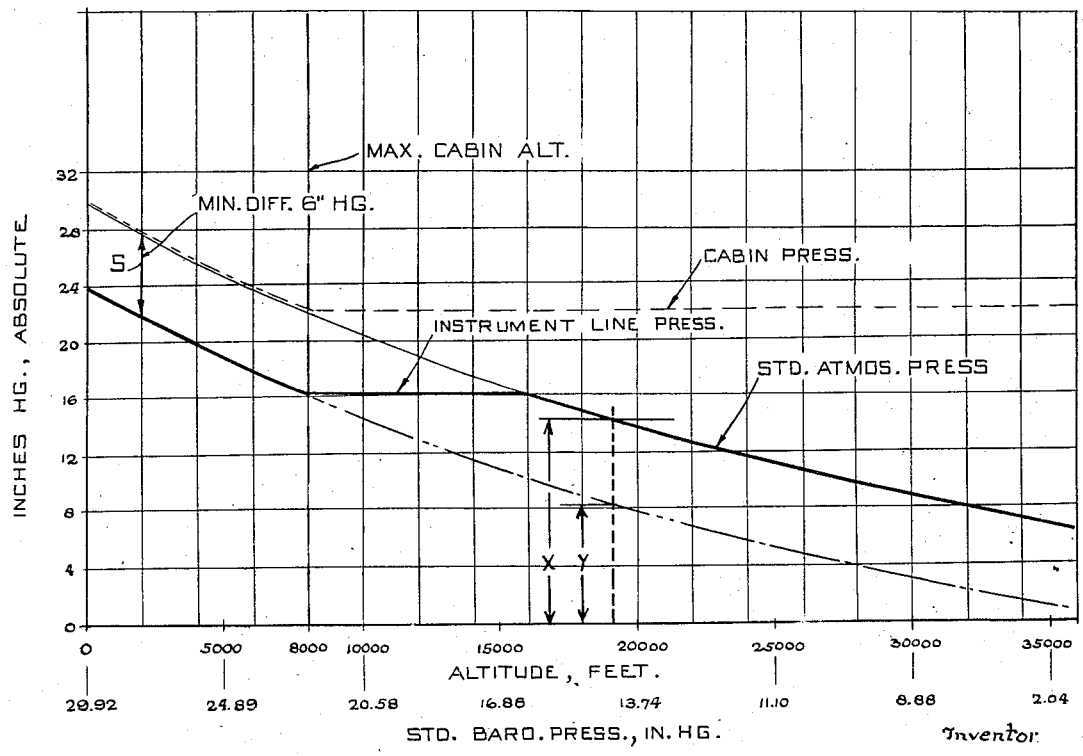

2,402,499

UNITED STATES PATENT OFFICE 2,402,499

PRESSURE-REGULATING SYSTEM

Donald M. Lawrence, Caldwell, N. J., assignor to Bendix Aviation Corporation, South Bend, Ind., a corporation of Delaware Application December 11, 1941, Serial No. 422,601

5 Claims. (Cl. 60—60)

This invention relates to pressure regulating systems, and more particularly to a system for maintaining a minimum differential of pressure for the operation of air-driven instruments in aircraft.

Many instruments, such as the directional gyro, gyro horizon, and turn indicator, are air-driven, and it is common to induce atmospheric air into the casing of each of these instruments directed at the conventional buckets carried on the rim of the gyro rotor and to exhaust the air at a definite suction pressure, so that the gyros may be spun with sufficient speed to carry out their different indicating or control functions. Suction is usually applied to the exhaust of the casing by means of a vacuum pump, which is usually driven directly from the engine. A regulating valve to damp out fluctuations in the suction line pressure is normally applied to a suction manifold, to which each of the different air-driven instruments of the airplane is connected. The vacuum pump exhausts to the atmosphere.

It has been common to draw the air for driving the different gyroscope rotors from outside the aircraft and to maintain sufficient suction, that is, a minimum pressure differential between the external atmosphere and the pump input. Due to the low air pressures obtaining at high altitudes, a positive displacement type of engine-driven pump, which is the type ordinarily used, is limited to the displacement of a lesser weight of air per unit volume than it displaces at sea level. It will therefore be apparent that with increasing altitudes, the conventional system will have difficulty in maintaining the required pressure differential for driving the gyroscopic rotors at constant speed.

It is an object of the present invention to provide a pressure differential regulating system for aircraft instruments wherein the minimum pressure differential may be obtained regardless of the altitude of the system.

It is a further object of the invention to provide a minimum pressure differential regulating device for use in conjunction with supercharged aircraft cabins, wherein, at increasing altitudes, the load on the suction or vacuum pump may be relieved.

Other objects include the provision of a pressure differential regulator device wherein air at superatmospheric pressure is drawn through the casing of gyro instruments by a suction pump through a suction line having a novel means for relieving the load on the suction pump at high altitudes, and also the provision of a regulating system wherein the suction line from an instrument casing in a supercharged cabin may be exhausted to the atmosphere under certain regulated conditions for decreasing the load on the suction pump.

Further objects will appear from a study of the following specification when made in conjunction with the attached drawings, throughout which like numerals designate like parts.

Fig. 1 is a schematic showing of one embodiment of the invention, wherein the differential regulating valve is shown in section;

Fig. 2 is a chart setting forth curves of certain atmospheric pressure relations to be maintained in the practice of the invention; and Fig. 3 is a chart containing curves representative of an advantage of the present invention over the prior art.

It will be assumed that a minimum differential pressure of 6" Hg is to be maintained between the input and the output of the casing of the air-driven instruments. An inspection of Fig. 2 will show that at sea level for a normal pressure of 29.92" Hg, the suction, or the differential, designated by "S," of 6" makes the suction pressure 23.92". It is not customary to supercharge an aircraft cabin at low altitudes, and we will assume that the supercharging is not to be effective until an altitude of 8000 feet has been reached. Thus, between zero and 8000 feet, the dashed line in Fig. 2, representing cabin pressure, is coincident with the solid line, indicating the change of standard atmospheric pressure with altitude.

At an altitude of 8000 feet, cabin supercharging is begun, and it is desired for altitude in excess of 8000 feet, to maintain the cabin pressure constant at a pressure represented by the atmosphere at 8000 feet, or approximately 22.22" Hg. It will be seen from the chart that to maintain a 6" differential pressure at an altitude of 8000 feet, will require a suction line pressure of approximately 16.22" Hg, absolute. In conventional systems, with the intake to the gyro rotors being obtained from the external atmosphere, as the altitude of the craft increases, the suction line absolute pressure decreases, if a differential of 6" is to be maintained, and finally, at the maximum altitude flown, the suction line pressure will be 6" less than the atmospheric pressure at that altitude. An inspection of the chart will show that at 23,000 feet, the atmosphere is at approximately 12.22" Hg, and to maintain the differential of 6", indicated by "S," the suction line pressure must be 6.22" Hg.

The suction ratio, that is, the ratio of atmospheric pressure to the 6″ Hg pressure value at any altitude, can be expressed as $x/y$, where $x$ is absolute atmospheric pressure $y$ is absolute atmospheric pressure minus 6″ Hg. In the conventional system, $x/y$ increases steadily with altitude, thus increasing the burden on the pump, at an altitude slightly above 35,000 feet, when $x$ becomes 6″ Hg, the ratio $x/y$ is infinite, and the minimum differential of 6″ Hg can no longer be maintained.

At sea level, the suction line pressure is 23.92″ Hg. With the instrument air intake being open to the atmosphere, this suction line pressure decreases constantly with altitude, and at 23,000 feet, the suction line pressure is 6.22″ Hg absolute. Even if the vacuum pump is rotated at an increased speed at the higher altitudes, the amount of free air to be displaced in order to maintain a suction pressure on the order of 6″ Hg requires an over-sized pump, and therefore, a heavier and more wasteful unit to be carried through the lower altitudes and higher atmospheric pressures.

In Fig. 3, the constantly drooping curve represents the theoretical percentage of free air displaced by a perfect pump for altitudes from zero to above 35,000 feet, with a suction pressure differential between input and output of 6″ Hg, where the instrument suction line input is taken, as in the conventional system, from the atmosphere.

The need for an over-sized suction pump is obviated by means of the present invention. Referring to the chart of Fig. 2, it will be seen that the cabin pressure is constant at 8000 feet and above 8000 feet. If the instrument casing intake is obtained from the supercharged cabin— that is, if the casing input pressure is 22.22″ Hg—and if the minimum differential maintained is 6″, then the suction line pressure is 16.22″ absolute and should not rise above this value.

By means of the present invention, the pump is unloaded automatically as the aircraft's altitude increases to the regions wherein the free air capacity of the conventional suction pump system tends to decrease. The heavy solid curve of Fig. 3 indicates the unloading cycle. From sea level to 8000 feet, the percentage drop in free air capacity is the same for the conventional system and the system of the present invention. The percentage drop, however, is negligible, being from 80% to approximately 73%. At 8000 feet, the cabin becomes sealed or constantly charged to an altitude pressure of 22.22″ Hg, and remains fixed at this pressure at all flight altitudes above 8000 feet. In the manner to be described below, the free air capacity of the suction pump, as a percentage of pump displacement increases to 100% at 16,000 feet, where the atmospheric pressure is only 16.22″ Hg, and above 16,000 feet, the free air capacity of the pump is constant at 100%. Thus, from 8000 feet to 16,000 feet, the suction pump in the novel system of the present invention is being steadily unloaded; that is, the input pressure gradually rises from 6″ Hg below the output pressure, until it becomes equal to the output pressure, at which point the suction pump becomes completely unloaded, and continues so for all flight altitudes above 16,000 feet.

As shown in Fig. 1, 10 represents a supercharged aircraft cabin containing a plurality of air-driven instruments 11, which instruments may be a rate of turn gyro, a directional gyro and an artificial horizon. Each of these instruments has an air intake port 12, which is open to cabin pressure, and their exhausts are connected to a suction regulating valve 13, which may be of the type shown in the Gregg 2,194,749 patent. Valve 13 connects to a suction or instrument line 14, which contains intermediate its ends a novel regulating valve assembly 15. Suction line 14 connects to the input 16 of an engine-driven suction pump 17, having an exhaust or output 18 open to the atmosphere. The pressure gauge 19 is connected to suction line 14 by means of a conduit 20. Pressure gauge 19 may be at the pilot's position in the aircraft, and its purpose is to indicate the instrument line pressure, which, in accordance with the present invention, will be always at least 6″ Hg below cabin pressure. Cabin pressure being maintained at 22.22″ Hg, the pressure at gauge 19 will never rise above 16.22″ Hg. Valve assembly 15 includes a housing member 21, having an input passageway 22 and an output passageway 23 in constant communication with the input passageway. The upper portion of housing 21 is formed into a cylindrical chamber 24 enclosing a piston 25, which is intended to slide readily therein, and yet, prevent the passage of air from chamber 24 to the input-output passageways 22, 23. Housing 21 also contains a depending cylindrical valve chamber 26, in which is formed a plurality of ports 27 in communication with a conduit 28 opening to the atmosphere. Valve chamber 26 contains a sleeve valve 29 having a bottom plate 30, which forms a bearing for one end of a helical spring 31 which is seated upon the top of an adjusting screw 32 carried in the bottom closure portion 33 of housing 21. Chamber 24 is open to the pressure of cabin 10 through a conduit 34, so that cabin pressure may be communicated at all times to chamber 24. Valve 29 and piston 25 are connected together through an integral connecting strip or web member 35, so that any movement of piston 25 will cause a corresponding movement of valve 29.

The resilience of spring 31 is such that sleeve valve 29 will keep ports 27 closed when the differential between the pressure in chamber 24 and that in the input-output passageways 22, 23 is less than or equal to, the determined differential of 6″ Hg. If the pressure in conduit 14 falls below 16.22″ Hg, then the pressure in passageways 22, 23 will fall correspondingly, and piston 25 will be forced downwardly by the over-balancing pressure in chamber 24, compressing spring 31 and opening ports 27 to the atmosphere.

An inspection of Fig. 2 shows that between 8000 and 16,000 feet, the differential between the instrument or suction line pressure and atmospheric pressure, which differential is 6″ at 8000 feet, gradually decreases, until, at 16,000 feet, the differential is zero, and further, the instrument line pressure becomes equal to atmospheric pressure. Although this differential between instrument line and atmospheric pressure decreases, the differential between the cabin and the instrument line pressures has been maintained constant, or at a minimum of 6″ Hg.

Referring to Fig. 3, it will be noted that between 8000 and 16,000 feet, the free air capacity of the pump steadily increases. This is due to the throttling of valve 29 between the altitudes of 8000 and 16,000 feet, by which throttling atmospheric air is admitted through ports 27 in progressively greater rates to unload the pump 17, and at 16,000 feet, the theoretically perfect pump 17 is completely unloaded. The variation between the theoretical and the practical unloading is very small due to the high volumetric efficiency of modern pumps, and therefore, for the purposes of description, we may consider pump 17 as a perfect pump.

Again referring to Fig. 2, it will be noted that the instrument line pressure at 16,000 feet and above follows the standard atmospheric pressure. This condition is brought about by the continued fall in pressure across the input and output of pump 17 as the altitude increases, resulting in low pressures in passageways 22, 23 as above set forth, the result of which is that valve 29 is kept completely open, and thus, pump 17 is relieved completely of load. As shown in Fig. 3, above 16,000 feet the free air capacity of the pump is a maximum. This condition obtains when the absolute input pressure equals the absolute output pressure—that is, when the ratio of $x$ to $y$ is one. This condition will be recognized as the condition in which pump 17 is doing no work, but is merely displacing a continuous volume of air without substantial pressure rise in the output, and therefore, the power required to drive the theoretically perfect pump is zero. In the case of the practical pump, the power is negligible.

By means of the system above described, it will be seen that a minimum pressure differential of 6″ is maintained even in the high altitudes, while the conventional system drawing atmospheric air through the casings of instruments, such as 11, requires a suction pump of considerably increased capacity over that required at sea level. Further, by the utilization of a constant cabin pressure greater than surrounding atmospheric pressure in the high altitudes, as the air input to instruments 11, and by utilizing the novel regulating valve 15 above described, there is obtained not only a satisfactory suction or instrument driving system, but a pump utilized as the source of suction at the lower altitudes is gradually relieved of work as the altitude increases, and the power therefore required to drive the suction pump at high altitudes is practically zero.

It is quite common for the same engine-driven pump to supply not only line suction for air-driven instruments, but also positive pressure for the inflatable boots of the conventional deicer system. As above set forth, pump 17 exhausts to the atmosphere through an output conduit 18. It is contemplated by the present invention that conduit 18 may be connected to the input of a deicer boot or deicer distributor valve of a conventional ice elimination system such as that shown in the Gregg Patent No. 1,990,866.

When the pump 17 is used as the pressure source of a deicer system, high altitude operation of the system is rendered feasible, since, in admitting atmospheric air through conduit 28 of the regulating valve assembly 15, a greater weight per unit volume of air displaced is afforded at the pump inlet 16, and thus, the pump 17 is capable of operating as an adequate source of deicer air pressure, whereas in the conventional, unregulated system, the air pressure available for deicer operation falls off as the altitude increases, due to the necessity of maintaining a fixed differential (such as 6″ Hg suction) on the pump inlet, resulting in a higher overall compression ratio and consequent reduction in pump output capacity.

It is believed clear, therefore, that by the use of the invention, an adequate source of suction is provided, and also, there is available an adequate source of pressure for deicer or other air pressure system requirements of an aircraft in the altitude regions wherein the conventional suction and pressure pump systems fail to provide the necessary suction pressure differential and positive pressure required, respectively, for instrument and for deicer operation.

While only one embodiment of the present invention has been shown in the drawings, it is to be understood that various changes may be made without departing from the scope of the present invention. For this reason, it is intended not to limit the invention by the description herein given as an example, but solely by the scope of the appended claims.

What is claimed is:

1. A suction system comprising a cabin having superatmospheric pressure, an instrument suction line opening into said cabin, a suction pump connected to said line and exhausting to the atmosphere, a regulating valve within said cabin for controlling the suction pressure in said line and auxiliary valve means interposed in said line between said pump and said regulating valve, said auxiliary valve means having a cylinder open to cabin pressure, a piston movable in said cylinder, a spring having a predetermined tension resisting movement of said piston due to the pressure of air in said cylinder, a port open to the atmosphere, and sleeve valve means for admitting atmospheric air through said port to said pump when the pressure in said instrument suction line falls below a predetermined differential value with respect to the pressure in said cylinder.

2. A system for maintaining a predetermined minimum pressure differential between a supercharged cabin and the external atmosphere, which comprises a valve having a cylindrical chamber, a piston slidable therein, a valve chamber, a port opening therein having communication to the atmosphere, a sleeve member in said chamber, a connection between said piston and said sleeve member, an air duct connecting said cabin and said cylindrical chamber, a suction line connected to said cabin, an air inlet to said valve, said line being connected to said air inlet, an air outlet, a suction pump connected to said outlet, said pump having an exhaust to the atmosphere, said port opening to the atmosphere and means responsive to an increase in pressure differential beyond the predetermined amount for actuating said sleeve valve to effect communication, through said port, between said atmosphere and said suction line.

3. In combination with a suction pump having an input, and an output open to the atmosphere, a suction line connected to said input and to a supercharged cabin, a pressure differential regulating device having an air inlet and an air outlet interposed in said suction line between said cabin and said pump, a cylindrical chamber having a piston therein, said chamber being open to the pressure of said cabin, a valve portion within said regulating device, said valve portion being movable with said piston, a port in said regulating device open to the atmosphere and means responsive to the exceeding of a determined pressure differential between the pressure in said cylindrical chamber and the pressure in said suction line to actuate said valve portion to establish communication between said suction line and the atmosphere.

4. In combination with a suction pump having an input, and an output open to the atmosphere, a suction line connected to said input and to a supercharged cabin, a pressure differential regulating device for controlling, regardless of altitude, the differential between the pressure of said cabin and of said suction line, having an air outlet interposed in said suction line between said cabin and said pump, a cylindrical chamber having a piston therein, said chamber being open to the pressure of said cabin, a valve within said device, means linking said piston and said valve, a port in said regulating device open to the atmosphere and means responsive to the existence of an excessive pressure differential between the pressure in said cylindrical chamber and the pressure in said suction line to actuate said valve portion to establish communication between said suction line and the atmosphere.

5. In combination with an engine-driven pump and a supercharged cabin subjected to varying external atmospheric pressures, said pump having an input in communication with said supercharged cabin, a device for maintaining a minimum desired pressure differential between the cabin pressure and the input of said pump, including a housing containing a valve, a port in said housing, the opening of which is controlled by said valve, a chamber open to cabin pressure, a member movable upon certain changes from said differential, means connecting said valve with said member, said port being so related to said valve that communication is established between said pump input and the external atmosphere when said differential is exceeded while the input of said pump is in communication with said supercharged cabin.

DONALD M. LAWRENCE.